United States Patent
Dowd et al.

(10) Patent No.: US 8,286,450 B2
(45) Date of Patent: Oct. 16, 2012

(54) POLARIZATION CONTROLLING OPTICAL FIBER PREFORM AND PREFORM FABRICATION METHODS

(75) Inventors: Edward M. Dowd, Madison, CT (US); Paul E. Sanders, Madison, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 2038 days.

(21) Appl. No.: 11/364,122

(22) Filed: Feb. 28, 2006

(65) Prior Publication Data
US 2006/0191295 A1  Aug. 31, 2006

Related U.S. Application Data

(60) Provisional application No. 60/657,216, filed on Feb. 28, 2005.

(51) Int. Cl.
*C03B 37/075* (2006.01)
(52) U.S. Cl. ............................................. 65/412; 65/404
(58) Field of Classification Search .................... 65/404, 65/412
See application file for complete search history.

(56) References Cited

U.S. PATENT DOCUMENTS

| | | | |
|---|---|---|---|
| 4,274,854 A | 6/1981 | Pleibel et al. | |
| 4,395,270 A | 7/1983 | Blankenship et al. | |
| 4,561,871 A * | 12/1985 | Berkey | 65/412 |
| 4,838,916 A | 6/1989 | Edahiro et al. | |
| 4,978,377 A | 12/1990 | Brehm et al. | |
| 5,152,818 A | 10/1992 | Berkey et al. | |

FOREIGN PATENT DOCUMENTS

| | | |
|---|---|---|
| EP | 0145031 A1 | 6/1985 |
| JP | 59217639 | 12/1984 |
| RU | 2233811 C2 | 8/2004 |
| WO | 0138244 A1 | 5/2001 |
| WO | 0164592 A1 | 9/2001 |

OTHER PUBLICATIONS

GB Search Report, Application No. 0604043.0, Dated Jun. 27, 2006.
Canadian Official Action, Application No. 2,537,755, Dated Aug. 4, 2008.
Canadian Office Action for Application No. 2,537,755, Dated Aug. 27, 2010.
GB Search Report for Application No. 0604043.0, dated Nov. 23, 2010.
GB Search Report for Application No. 0604043.0, dated Jan. 19, 2011.

* cited by examiner

*Primary Examiner* — Queenie Dehghan
(74) *Attorney, Agent, or Firm* — Patterson & Sheridan, LLP

(57) ABSTRACT

Methods to fabricate an optical preform for draw into Polarization Maintaining (PM) or Polarizing (PZ) optical fiber are provided. The methods involve assembly of pre-shaped and pieced together bulk glass elements into preforms ("assembled preforms") for simultaneous fusing and drawing into optical fiber. These preforms form a stress-induced birefringent optical core when drawn to fiber.

10 Claims, 3 Drawing Sheets

POLARIZATION CONTROLLING OPTICAL FIBER PREFORM AND PREFORM FABRICATION METHODS

CROSS-REFERENCE TO RELATED APPLICATIONS

This application claims benefit of U.S. provisional patent application Ser. No. 60/657,216, filed Feb. 28, 2005, which is incorporated herein by reference.

BACKGROUND OF THE INVENTION

1. Field of the Invention

Embodiments of the present invention generally relate to optical fibers and, more particularly, to preforms for making polarization controlling optical fiber and methods for fabricating such preforms.

2. Description of the Related Art

Optical fibers are typically formed by heating and drawing an optical fiber preform. The preform typically includes a core and surrounding cladding, with appropriate dopants to achieve desired characteristics. In an effort to control polarization (e.g., maintain polarization or achieve a desired polarization) of light transmitted through the core of the resulting optical fiber, the preform often includes stress-inducing members.

Traditionally, polarization maintaining (PM) fibers have been designed incorporating diametrically opposed elements that induce asymmetric radial stresses on the fiber core, thereby creating birefringence in the core. These stress elements are typically silica glass that is heavily doped with boron, germania, and/or phosphorous oxides, which greatly increase the glass thermal expansion coefficient. Examples of fibers with typical stress elements placed around a core 102 and cladding 104 are illustrated in FIG. 1. These include a fiber 100 with an elliptical shaped element 106, a fiber 120 with two circular rods 126 (PANDA), and a fiber 130 with a 'bow-tie' element 136.

The preform fabrication processes differ for each of these designs. The elliptical and bow-tie design preforms are manufactured using the modified chemical vapor deposition (MCVD) method, where all of the glass components are deposited within a glass tube. The elliptical design fiber is achieved by grinding parallel sides on the preform prior to drawing. The bow-tie design is achieved by etch and deposition methods inside the tube during the MCVD process. The MCVD process is limited by the amount of glass that can practically be deposited inside of a tube. Also, as the tube wall becomes heavier with deposited glass, the final collapse step of the MCVD process becomes much more difficult. The 'PANDA' design involves manufacture of an optical preform via traditional MCVD, Vapor-phase Axial Deposition (VAD), or Outside Vapor Deposition (OVD) methods and then drilling holes longitudinally to insert the glass stress elements prior to fiber drawing. This method is limited by the ability to machine precise, long length-wise holes in the host preform.

In depressed refractive index fiber designs, such as with a pure silica glass core fiber, it is desirable to have a large optical clad to core ratio (~>6) to reduce bend-induced waveguide losses. The clad to core ratio may be decreased by increasing the core to clad refractive index difference, however the fiber's core size may become too small for practical use. Unfortunately, conventional PM fiber preform designs described above are limited to the type of glass that may be deposited with vapor deposition methods. Further, these designs typically produce preforms of small volume, which yield relatively small batches of optical fiber.

Accordingly, what are needed are improved methods to efficiently manufacture preforms to produce polarization controlling fibers.

SUMMARY OF THE INVENTION

Embodiments of the present invention generally provide stress-induced birefringent polarization controlling (polarization maintaining or polarizing) optical fiber designs and improved methods to efficiently manufacture preforms to produce such fibers.

One embodiment provides a technique for fabricating an optical fiber preform by assembling pre-shaped sections of glass materials surrounding an inner rod having a core and cladding, and surrounding the pre-shaped sections by a glass tube. Two of the pre-shaped sections, placed diametrically opposed to one another, are made from a material having a relatively higher coefficient of thermal expansion than the other elements.

Another embodiment provides a technique for fabricating an optical fiber preform by surrounding an inner rod having a core and cladding with a stress element tube and inserting the stress element tube into a pre-shaped outer tube which has a wall thickness on two opposing sides that is thinner than in remaining portions of the outer tube.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the present invention provide various methods to fabricate an optical preform for draw into Polarization Maintaining (PM) or Polarizing (PZ) optical fiber. The methods described involve assembly of pre-shaped and pieced together bulk glass elements into preforms ("assembled preforms") for simultaneous fusing and drawing into optical fiber. These preforms form a stress-induced birefringent optical core when drawn to fiber. These methods allow for the fabrication of large preforms that are generally limited only by the size of the draw furnace opening and the length of the preform feed mechanism, allowing relatively large batches of optical fiber to be drawn efficiently. These methods also allow a greater range of glass compositions for various fiber core, cladding and stress-applying parts in the use of bulk glass elements that can be produced by means of sol-gel or melt/casting processes.

As used herein, the term polarization controlling fiber broadly refers to polarization maintaining (PM) and polarizing (PZ) fibers. Those skilled in the art will recognize that, while the techniques described herein may be applied to produce all types of polarizing controlling fibers, these techniques are not limited to these applications and may also be applied to produce assembled preforms to draw other types of fiber.

An Exemplary Preform Assembly Technique

Figure 1:
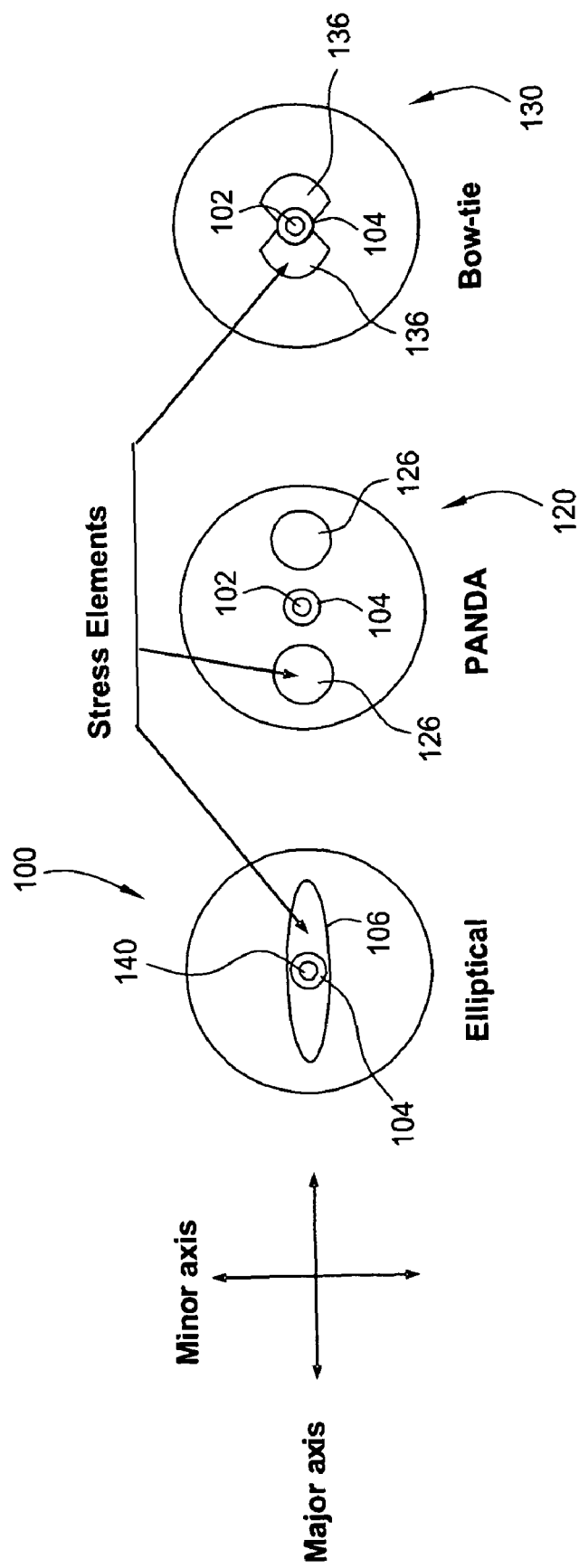
FIG. 1 illustrates exemplary fibers formed with conventional fiber preform techniques.
Figure 2:
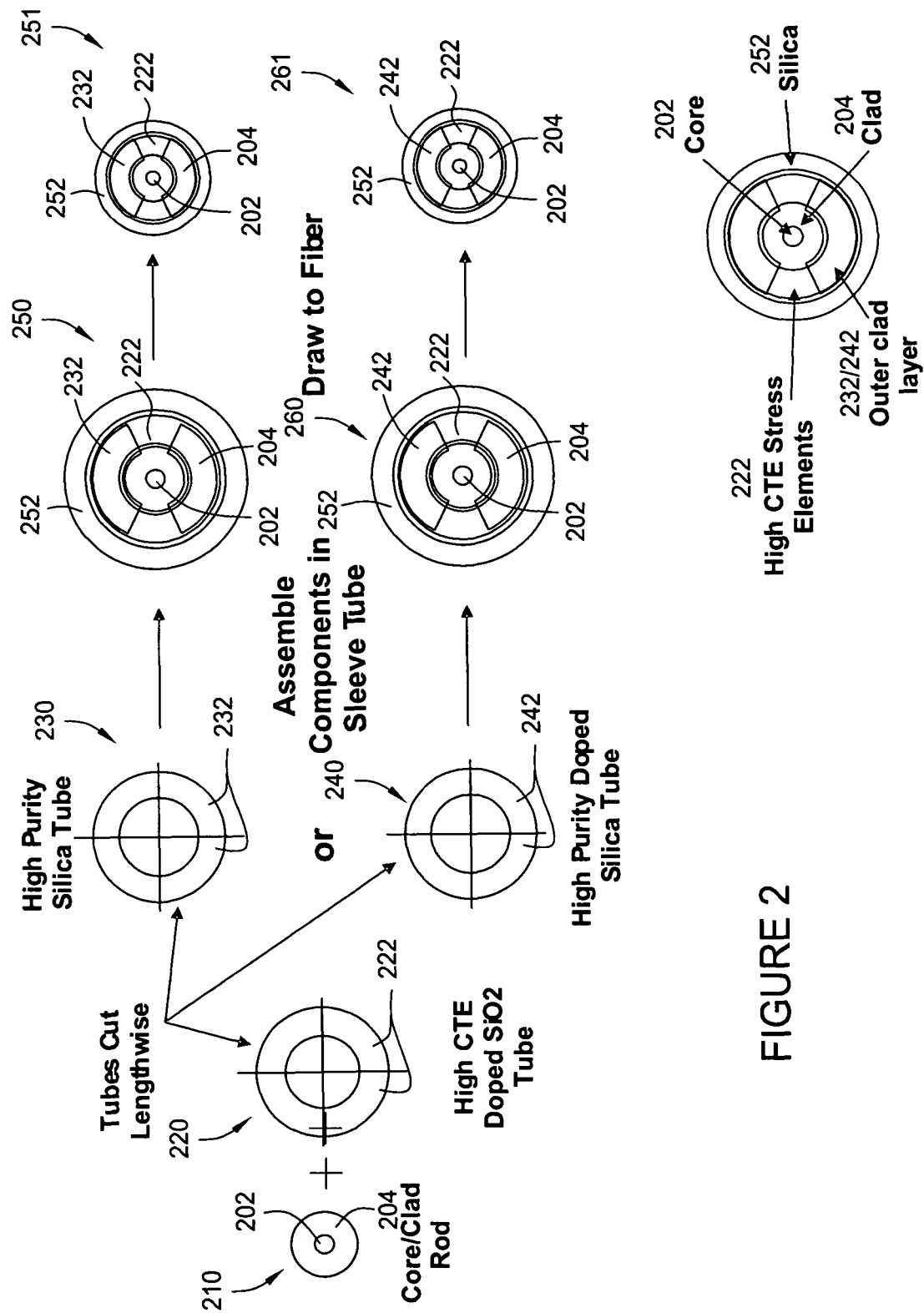
FIG. 2 illustrates an exemplary technique of forming a fiber preform, in accordance with embodiments of the present invention, and a polarization controlling fiber drawn therefrom.

FIG. 2 illustrates one exemplary technique for producing an assembled preform. The figure shows cross-sections of two exemplary assembled preforms 250 and 260 at various stages of assembly, and the resulting fibers 251 and 261. According to this technique, high purity glass components are machined and assembled prior to high temperature draw to fiber. As a result, the glass components need not be deposited by means of conventional slow deposition processes, but can be produced by other suitable means, such as high purity sol-gel or melt/casting processes.

The preforms 250 and 260 vary in the particular materials used to fabricate an outer clad layer. Referring first to preform 250, a glass rod 210 consisting of a core 202 and inner clad 204 of lower refractive index is surrounded by sections 232 cut (lengthwise) from glass tubing 230 and sections 222 cut from glass tubing 220, which are then surrounded by a solid glass tube.

The two sections 222, placed diametrically opposed to one another, are cut from tube 220 made from a glass with a relatively higher coefficient of thermal expansion (CTE) than the rest of the glass components and will become stress-applying elements. As an example, the glass tube 220 may be made from silicon oxide (SiO2) doped with material to increase the CTE. The other sections 232 are cut from glass tubing 230 that may have a refractive index matched to the inner clad material 204 and have a relatively low CTE. As an example, the glass tube 230 may be made from high purity silica. Of course, rather than cutting the sections 222 and 232 from a tube, they may be formed/pre-shaped in any other suitable manner.

The silica is doped in the core, clad, and sections 232, 242 abutting the stress elements in order to produce refractive indexes suitable for waveguide performance. The dopant level in these areas is kept relatively low compared to the stress-applying elements to maintain a low CTE. The stress-applying elements are doped heavily to form a relatively high CTE as to create a stress-induced birefringence on the core glass when the preform assembly is drawn to fiber. The glass components may be fabricated by conventional high purity sol-gel glass manufacturing methods. It is possible to fabricate the core/clad rod from conventional MCVD, VAD, or OVD manufacturing processes. It is also possible to fabricate the core/clad rod by applying rod-in-tube methods or other processes using bulk glass elements. This allows for the incorporation of a broad range of core and cladding materials, such as non-silica and non-oxide glasses, over conventional soot processes that typically produce silica glasses, being compositionally limited or bound by the availability of precursor source gases, as well as glass compositions that are compatible to the relatively high thermal processing associated with these processes. As illustrated, preform 260 may be assembled in the same manner as preform 250, but with a different combination of materials surrounding the core/clad rod 210. For example, in the preform 260, sections 242 cut from tube 240 made of high purity doped silica may be substituted for the sections 232 used in the preform 250. Those skilled in the art will recognize that any combination of suitable materials may be used with the particular materials chosen, for example, based on the particular needs of a given application.

For both illustrated preforms, the glass may be doped in the core, clad, and sections (232, 242) abutting the stress elements 222 in order to produce refractive indexes suitable for waveguide performance. The dopant level in these areas may be kept relatively low compared to the stress-applying elements to maintain a low CTE. The stress-applying elements may be doped heavily to form a relatively high CTE as to create a stress-induced birefringence on the core glass when the preform assembly is drawn to fiber. The glass components may be fabricated by conventional high purity sol-gel glass manufacturing methods. It is possible to fabricate the core/clad rod from conventional MCVD, VAD, or OVD manufacturing processes. The core/clad rod could also be fabricated using rod-in-tube or other methods that process bulk glass elements. These elements could be comprised of non-silica based glasses to impart optical performance limited by silica-based glasses, for example telluride and bismuth glasses that exhibit much high nonlinear refractive index response than silica glass, or chalcogenide and other non-oxide glasses that are transmissive in the mid-infrared and other spectral regions.

The core/clad rod 210 can range in diameter from a few millimeters to 20 millimeters or more. The diameter ratio between the clad 204 and core 202 typically ranges from 2 to 8, depending on the refractive index difference between the two elements. The core material can be pure silica or silica doped with germanium oxide. The clad material can be pure silica or silica doped with fluorine and/or germanium oxide. Typical germania concentrations in the core are in the 0 mol % to 15 mol % range. In the clad, typical fluorine concentrations range from 1 mol % to 5 mol % with germania concentrations ranging from 0 mol % to 5 mol %. The dopant concentrations within the core and clad regions are adjusted to produce an index difference between the core and clad to yield a suitable single mode optical waveguide. For example, the core/clad rod 210 may be made of a core element 202 consisting of silica doped with 8 mol % germanium oxide and a clad 204 of pure silica. The resulting waveguide will have a refractive index difference between the core and clad of about 0.0125.

In another example, the core 202 may be made of pure silica and the clad 204 consist of silica doped with 7 mol % fluorine, yielding a waveguide with a refractive index difference between the core and clad of 0.010. The high CTE glass 220, 222 that forms the stress-applying element is silica-based glass doped heavily with two or more of: germanium oxide, boron oxide, phosphorous oxide, or fluorine. The overall concentration of dopants within the silica can be up to 70 mol % or greater, with ratios of the dopants adjusted to produce a refractive index corresponding to the clad 204 material. The high purity doped silica 240, 242 typically consists of dopants matched to that of the clad material 204 and results in a glass with relatively low CTE compared to the stress-applying element. The dimensions of the glass components may be selected to provide a close fit, for example, in an effort to minimize gaps between parts yet allow practical assembly of the preform.

For some embodiments (e.g., to facilitate handling), the glass components may be held together on one or both ends by fusing or some type of fixturing. In any case, the preform assembly is then lowered into a fiber optic draw furnace (not shown) and drawn into an optical fiber (251 or 261). This type of preform assembly is generally not limited to the type of glass that may be deposited with vapor deposition methods. As a result, this type of preform assembly fabrication allows for large volume preforms which may yield many times the length of PM/PZ optical fiber drawn from conventionally made preforms. For example, PM preforms manufactured by the MCVD method typically range in diameter of 10 mm to 16 mm. The new assembly method allows for preforms with diameters of 50 mm or more.

Another Exemplary Preform Assembly Technique

Figure 3:
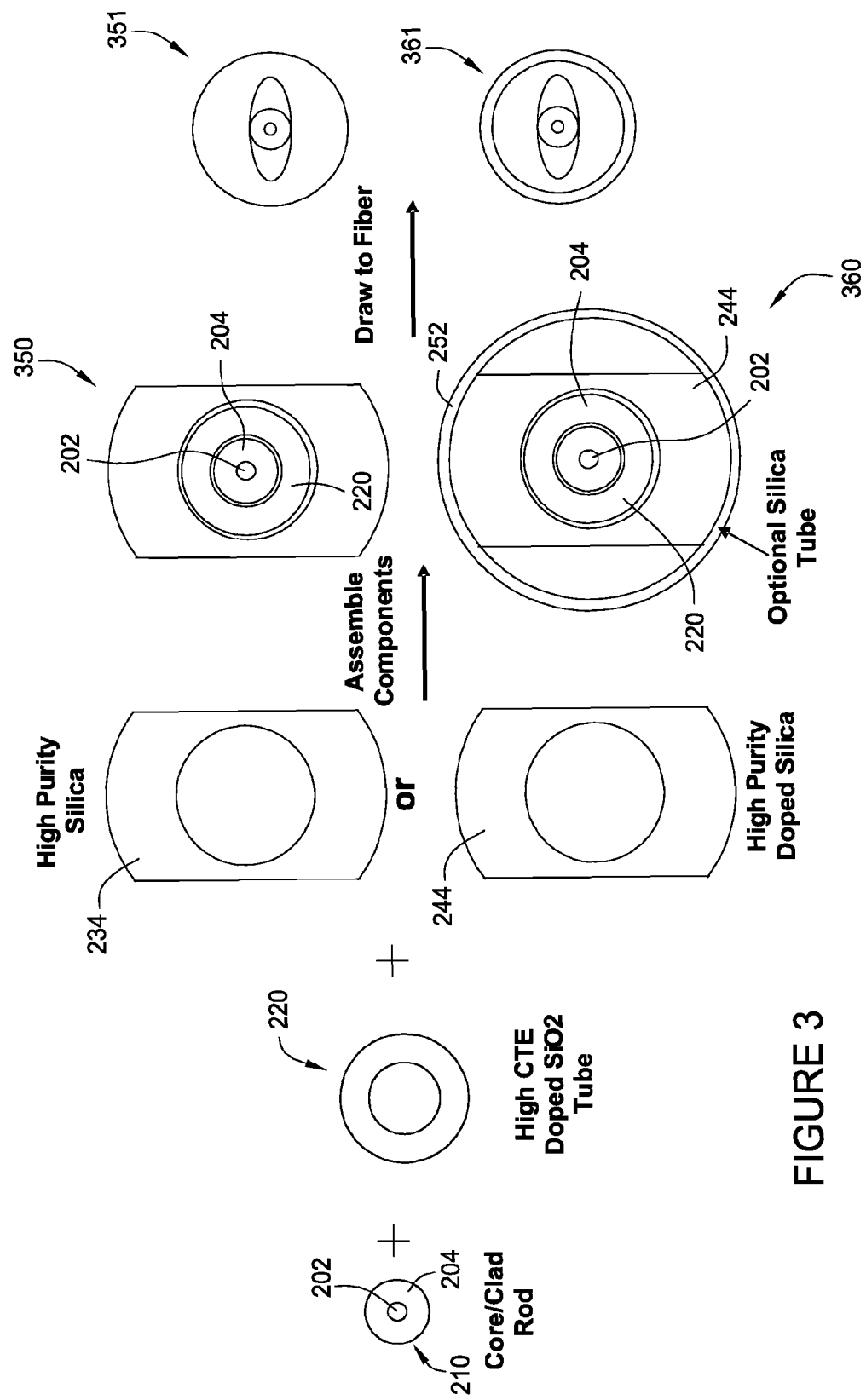
FIG. 3 illustrates another exemplary technique of forming a fiber preform, in accordance with embodiments of the present invention, and a polarization controlling fiber drawn therefrom.

FIG. 3 illustrates another exemplary technique for producing an assembled preform. As with FIG. 2, this figure shows cross-sections of two exemplary assembled preforms 350 and 360 at various stages of assembly, and the resulting fibers 351 and 361.

According to this technique, the core/clad rod 210 and a high CTE/low melt viscosity stress element tube 220 are nested and then surrounded by an outer tube which has a thin wall thickness on two opposing sides. As an example, this outer tube may be formed by grinding two parallel sides of a glass tube. As illustrated, the outer tube may be formed of high purity silica 234 (preform 350) or high purity doped silica (preform 360).

In any case, the preform assembly (350 or 360) is then lowered into a draw furnace and fused together while drawing to fiber. As the preform is heated and drawn, the outer tube will become circular in cross-section by surface tension causing the inner low viscosity stress element glass 220 to deform into an ellipse. For some embodiments, as illustrated by preform 360, if the outer clad region is to have an index matched to the inner clad, the shaped tube 244 may be surrounded by another tube 252 (e.g., of pure silica) prior to draw.

CONCLUSION

While the foregoing is directed to embodiments of the present invention, other and further embodiments of the invention may be devised without departing from the basic scope thereof, and the scope thereof is determined by the claims that follow.

What is claimed is:

1. A method for fabricating an optical fiber preform, comprising:
assembling pre-shaped sections of glass materials surrounding an inner rod having a core and cladding, wherein at least two of the pre-shaped sections, placed diametrically opposed to one another, are made from a material having a relatively higher coefficient of thermal expansion than the other pre-shaped sections, wherein the at least two of the pre-shaped sections comprise doped silica-based glass, wherein the doped silica-based glass comprises at least two dopants, and wherein ratios of the dopants are selected to produce a refractive index of the silica-based glass matched to a refractive index of the cladding; and
surrounding the pre-shaped sections by a glass tube.

2. The method of claim 1, wherein surrounding the pre-shaped sections results in an optical fiber preform with an outer diameter of at least approximately 50 mm.

3. The method of claim 1, wherein the dopants comprise two or more of germanium oxide, boron oxide, phosphorous oxide, or fluorine.

4. The method of claim 1, wherein an overall concentration of the dopants within the silica-based glass is up to 70 mol %.

5. The method of claim 1, further comprising cutting a tube of glass having the relatively higher coefficient of thermal expansion (CTE) to form the at least two pre-shaped sections.

6. The method of claim 1, further comprising cutting a tube of glass having a relatively lower coefficient of thermal expansion (CTE) to form the other pre-shaped sections.

7. The method of claim 6, wherein the tube of glass having the relatively lower CTE comprises high purity silica.

8. The method of claim 6, wherein the tube of glass having the relatively lower CTE comprises high purity doped silica.

9. The method of claim 6, wherein the tube of glass having the relatively lower CTE has a refractive index corresponding to a refractive index of the cladding.

10. The method of claim 1, further comprising fusing at least one end of the optical fiber preform to hold the glass tube and the pre-shaped sections of glass materials together.

* * * * *